May 15, 1934.  T. STANISLAW  1,958,724
FISH AND CRAB TRAP
Filed Nov. 16, 1933
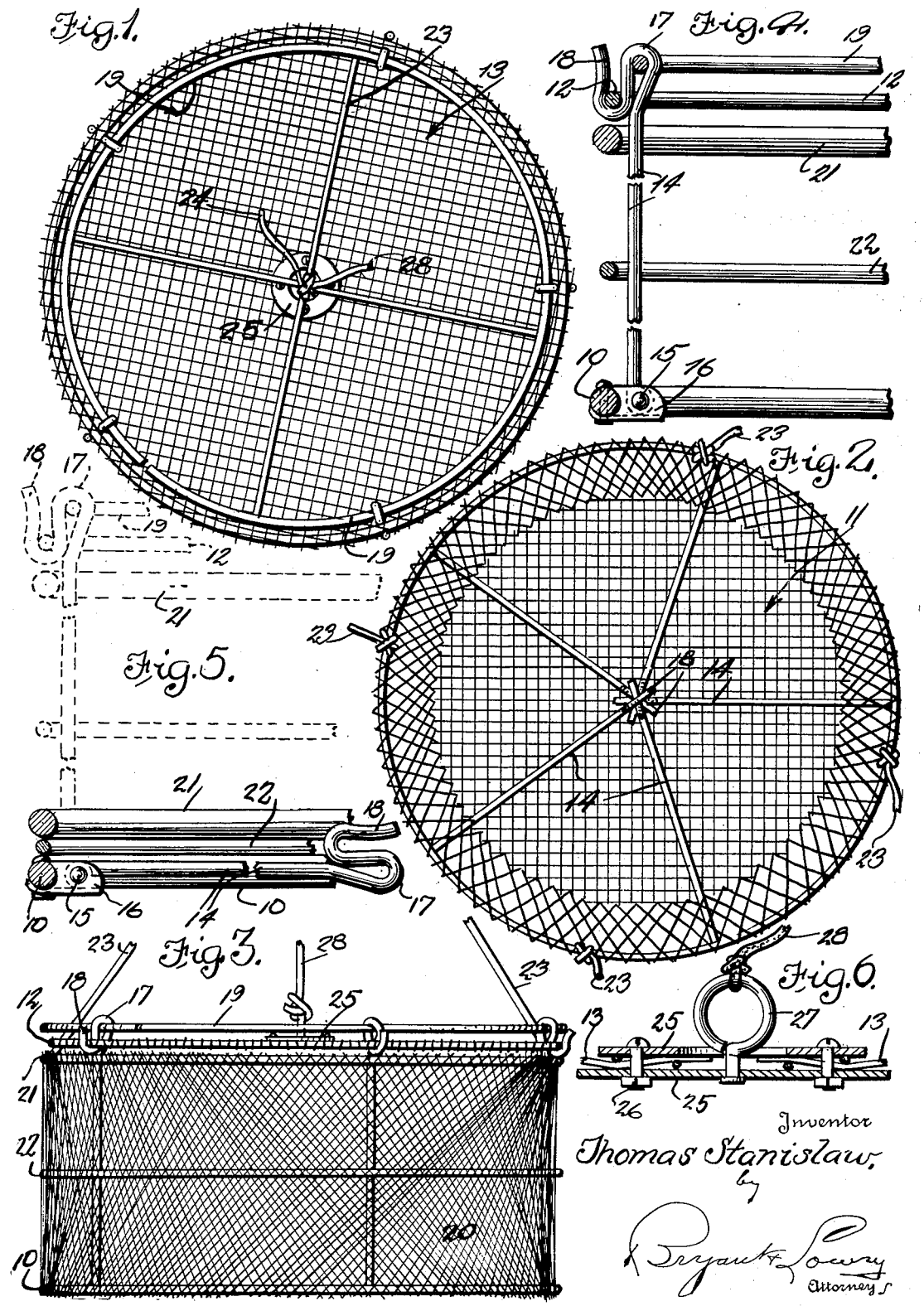

Patented May 15, 1934

1,958,724

UNITED STATES PATENT OFFICE 1,958,724

FISH AND CRAB TRAP

Thomas Stanislaw, Newark, N. J.

Application November 16, 1933, Serial No. 698,332
3 Claims. (Cl. 43—100)

This invention relates to certain new and useful improvements in fish and crab trap.

The primary object of the invention is to provide a fish and crab trap having top and bottom screen walls and a collapsible side wall adapted to be shifted to extended or closed position at the will of the operator for confining fish, crabs or the like in the trap.

A further object of the invention is to provide a trap of the foregoing character wherein the top and bottom walls are maintained in spaced relation by rods hinged to the bottom wall and engaged with the top wall, combined with a locking ring for maintaining the upper ends of the rods immovable relative to the top wall so that accidental collapse of the top wall of the trap is prevented.

It is a further object of the invention to provide a fish and crab trap embodying a collapsible side wall having pull cords associated therewith for closing the wall and said trap further including a suspension cord unaffective for operating the collapsible side wall so that the trap may be set and suspended in water at the desired depth.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a fish and crab trap constructed in accordance with the present invention, the same being illustrated in its extended position;

Figure 2 is a top plan view of the trap with the top wall removed and illustrating the rods for holding the top spaced from the bottom in their folded condition with the side wall of the trap collapsed;

Figure 3 is a side elevational view of the trap in its extended position and the locking ring engaged with the rod for retaining the latter engaged with the top wall of the trap;

Figure 4 is a fragmentary side elevational view of the frame structure of the trap with the screen and net construction removed for clearness and illustrating the side rods extending between the bottom and top walls of the trap and the locking ring engaged with the upper ends of the rods above the top wall of the trap;

Figure 5 is a fragmentary side elevational view similar to Figure 4, showing the frame structure of the trap in collapsed condition and further illustrated by dotted lines in extended position similar to Figure 4; and Figure 6 is a detail sectional view of the central portion of the top wall of the trap;

The fish and crab trap is of circular formation and includes a bottom wall formed of a ring 10 and a screen 11, the top wall being similarly constructed and including a ring 12 and screen section 13.

The connection between the bottom and top walls of the trap include a plurality of circumferentially spaced rods 14 that are hingedly mounted at their lower ends as at 15 to brackets 16 directed inwardly of the ring 10 of the lower wall, and said rods 14 all being of a length that when collapsed to permit folding movement of the trap, their free ends meet each other centrally of the bottom wall as shown in Figure 2. A return-bent portion is provided in the free end of the rod 14 to provide a substantially closed loop 17 and the return bent portion is then directed outwardly to provide a hook 18. To support the top wall of the trap in fixed relation to the bottom wall, the rods 14 are shifted to a perpendicular position with the loop 17 at the free end of the rod directed through an opening in the wire mesh 13 adjacent the ring 12 with the ring engaged by the hooks 18, the upper end of the loop 17 in this position extending above the screen 13 of the top wall.

To provide a locking engagement between the rod hooks 18 and the ring 12 of the top wall, there is provided a split locking ring 19 that threads through the loops 17 of the several rods 14 above the screen mesh 13, as shown in Figure 1, this arrangement preventing upward movement of the top wall relative to the rods 14 and escape of the top wall ring 12 from the hooks 18. It is to be understood that a locking wedge or key may be associated with each loop 17 above the screen mesh of the top wall for lockingly retaining the rod hooks 18 engaged with the top wall ring 12.

The annular side wall of the trap includes a collapsible net body or sheet 20 provided with an upper edge ring 21 and an intermediate reinforcing ring 22. A series of circumferentially spaced cords 23 are attached to the upper ring 21 of the side wall and thread through an opening in the screen mesh 13 of the top wall adjacent the ring 12 with the several cords 23 knotted together centrally of the trap above the same and from which a single operating line 24 extends.

The screen mesh 13 of the top wall is reinforced centrally thereof by a pair of disk plates 25 engaged with opposite sides of the screen mesh 13 as shown in Figure 6 and clamped in position by the bolt and nut combinations 26. An eye-bolt 27 carried by the lower plate 25 projects through an opening in the upper plate 25 for the attachment of a suspension cord 28.

When the trap is collapsed for storage or shipment, the rods 14 are swung downwardly on their hinge connections 15 with the ring 10 of the bottom wall to lie upon the screen mesh of the bottom wall as shown in Figure 2, the top wall and locking ring 19 being superposed thereon. To set up the trap to operative position, the rods 14 are moved perpendicularly relative to the bottom wall and are engaged with the ring 12 of the top wall as previously described, the locking ring being inserted through the loops 17 to retain the hooks 18 of the rods 14 engaged with the ring 12. With the side wall 20 of the trap in collapsed condition, the trap is lowered into the water by means of the cord 28 and the same may be suspended at the desired depth of the water or may be allowed to rest upon the water bed. Bait or the like may be mounted upon the bottom wall of the top and to close the side wall 20, it is only necessary to exert a pull upon the cord 24 for extending the side wall to the closed position of Figure 3.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

1. In a fish and crab trap, top and bottom walls of screen construction and each including a ring, rods hinged to the bottom wall ring, the other end of each rod having a closed loop and open hook with the loop projected through the screen of the top wall adjacent the top wall ring with the top wall ring supported by the rod hooks, a locking ring threaded through the rod loops above the top wall screen to prevent upward movement of the top wall ring relative to the rod hooks and a collapsible side wall for the trap.

2. In a fish and crab trap, top and bottom walls of screen construction and each including a ring, rods hinged to the bottom wall ring, the other end of each rod having a closed loop and open hook with the loop projected through the screen of the top wall adjacent the top wall ring with the top wall ring supported by the rod hooks, means engaged with the rod loops above the top wall screen to prevent upward movement of the top wall ring relative to the rod hooks and a collapsible side wall for the trap.

3. In a fish and crab trap, top and bottom walls of screen construction and each including a ring, rods hinged to the bottom wall ring, the other end of each rod having a closed loop and open hook with the loop projected through the screen of the top wall adjacent the top wall ring with the top wall ring supported by the rod hooks, a locking ring threaded through the rod loops above the top wall screen to prevent upward movement of the top wall ring relative to the rod hooks and a collapsible side wall for the trap, a pair of reinforcing clamp plates engaged with the top wall screen centrally thereof, a cord attached to the clamp plates for suspension of the trap at the desired depth in water and independent closure cords for the side wall of the trap.

THOMAS STANISLAW.